D. FLANERY.
Electric Lighting.
No. 223,495. Patented Jan. 13, 1880.
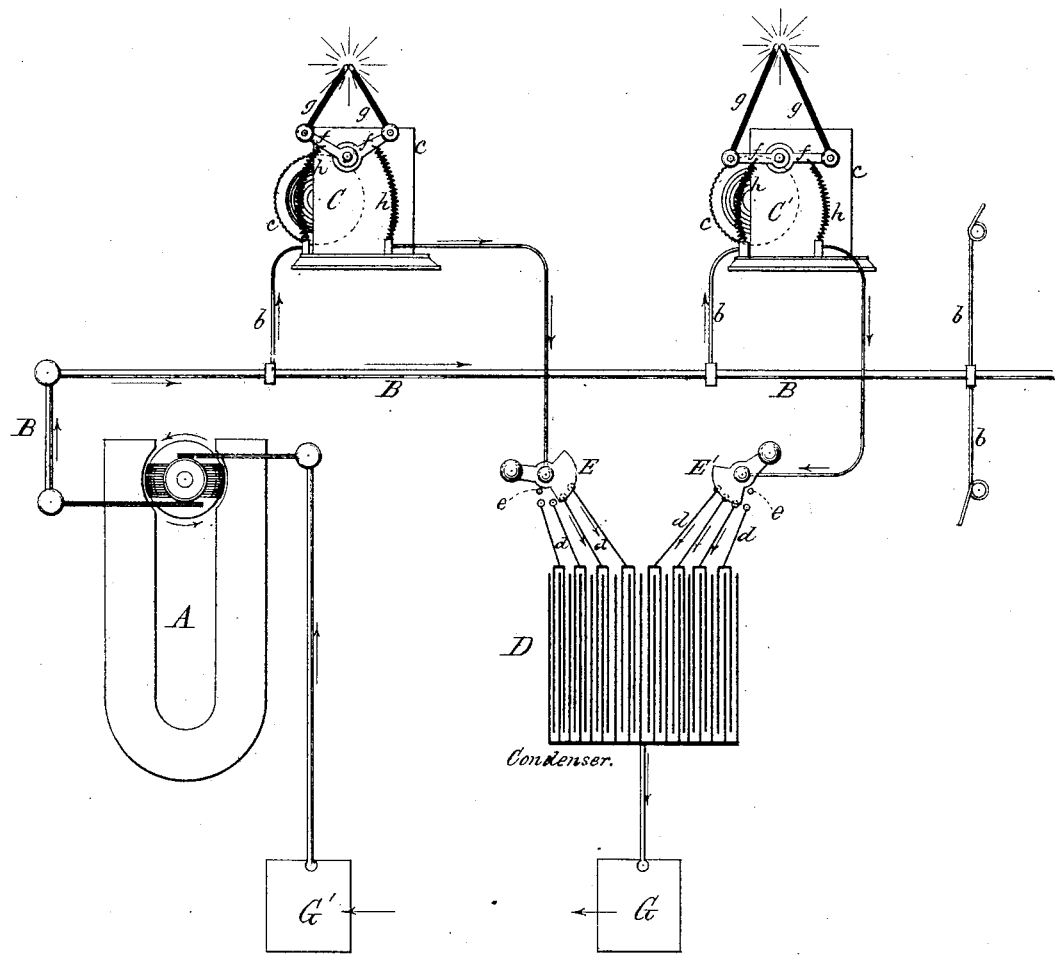

UNITED STATES PATENT OFFICE.

DAVID FLANERY, OF JACKSON, MISSISSIPPI.

ELECTRIC LIGHTING.

SPECIFICATION forming part of Letters Patent No. 223,495, dated January 13, 1880.

Application filed November 6, 1879.

To all whom it may concern:

Be it known that I, DAVID FLANERY, of Jackson, Hinds county, State of Mississippi, have invented certain new and useful Improvements in Electric Lighting, of which the following is a specification.

The chief aim of my invention is to provide an improved mode of regulating and dividing the electric current to uniformly supply and maintain one or more lamps; and the main feature of my invention may be stated to consist in the employment of an electric condenser in the circuit of the generator and lamp or lamps, the said condenser being divided into sections, so that by turning a switch in the circuit more or less of these sections may be thrown into or out of the circuit, thus increasing or decreasing the capacity of the condenser, and accordingly increasing or decreasing the generative action of the machine, whereby the strength and intensity of the current to each lamp are regulated as required and one lamp rendered independent of the others in the circuit.

My invention also consists in the relative arrangement and connection of the several parts of the apparatus, and in a special form of lamp, as hereinafter fully set forth.

The annexed drawing presents a view of my improved electric-lighting apparatus complete, most of its parts being represented conventionally for simplicity and clearness of illustration.

In the drawing, A indicates the generator of electricity, preferably a magneto-electric machine of the Siemens or other kind, driven by a suitable motor, in the usual manner, and arranged to give an alternating current. One terminal of the generator is connected with a large wire or conductor, B, of low resistance, which may be arranged under or over ground along the course where the light is to be distributed, and properly insulated on its course. The other terminal of the generator is preferably connected to a ground-plate, G'.

From the conductor B lateral branches $b$ may be extended to connect with the lamps, which are indicated by C C', and may be of any number, according to the power of the apparatus, and one side or terminal thereof is connected to the branches or sub-branches of the main conductor, as illustrated.

Now, D indicates an electrical condenser, one side of which is connected with the opposite terminals of the lamps, while the other side of the condenser preferably connects to the ground-plate G, so that the circuit from the condenser to the generator is completed through the earth, which is preferable; but, of course, a return-wire may be used when desirable.

The condenser is constructed in any of the approved manners, preferably of plates of brass, alternating from opposite sides of the condenser and separated by plates of mica; but other equivalent materials may, of course, be adopted, as electricians will readily understand.

The size or capacity of the condenser is proportioned according to the power of the apparatus and the number of lights to be maintained, which will necessarily vary in different cases.

It will be now observed that each lamp connects to a distinct portion of the condenser, as illustrated, and that these portions are divided into a number of sections, each section consisting, say, of a pair of condenser-plates, from each of which separate wires $d$ extend to fixed knobs arranged in the sweep of switches E E'. Now, the terminals of the lamps, which extend to the condenser, connect directly to these switches, so that by turning the switches more or less a greater or less number of the condenser-sections may be turned into circuit with the lamps and into the general circuit of the apparatus.

The movement of the switches in either direction is limited by the stops $e$, and by turning the switch off all the wires the lamp corresponding to the switch will be extinguished, and may be again lighted by turning the switch on, as will be readily understood.

It will now be perceived that by adjusting the switches of the different lamps on the condenser one way or the other, the electrical capacity of the condenser, or of that portion in the circuit, may be increased or diminished at will, and this increase or decrease in the capacity of the condenser causes the generative action of the machine A to increase or decrease correspondingly, so that by this means the quantity and intensity of the current produced by it may be raised or lowered, according to the demands of the lights, sufficient electricity being generated in each case to amply maintain the lights and overcome the resistance of the circuit, and no more work being thus put upon the generator than is necessary to produce the desired effect. In this way the current to each lamp may be proportioned to suit the size and character thereof, and to maintain it either in a high or low state of action, as may be desired. Furthermore, as each lamp is in circuit with a distinct portion of the condenser, one lamp may be extinguished deliberately, or may go out accidentally, without affecting the others, each lamp in the circuit being independent of the others, thus presenting many advantages in favor of this mode of division and regulation.

Any suitable form of lamp may be used in my apparatus, either incandescent or carbon lamps, and of the latter class the "point-to-point" or candle lamps may be used. I have devised, however, a novel form of carbon lamp, which I have illustrated in connection with my apparatus, and which may be used to advantage. In this lamp, $c$ indicates a strong clock-movement, which impels radial arms $f\,f$ similarly to the hands of a clock, but with an equal motion. The ends of these arms are provided with swiveled sockets, in which the carbons $g\,g$ are held. The upper ends of the carbons incline toward each other, and they are fed together at the required rate by the slow rotation of the arms, which may be rendered faster or slower by setting the clock-movement fast or slow. The current is conveyed to the carbons by the flexible spirals $h\,h$, connecting with the arms, or in any other suitable manner which will allow the free motion of the arms.

Where but one light is required the lamp may be placed in any part of the circuit—between the generator and the condenser, between the condenser and the ground, or between the ground and the generator. For general purposes, however, where two or more lights are used, the position of the several parts, as illustrated in the drawing, is preferable, if not essential.

Instead of employing a magneto or dynamo electric machine as the generator, a voltaic battery may be substituted with a pole-changer for producing an alternating current.

A continuous current may, however, be sometimes used; but the efficiency of the apparatus in this case would be so slight that its employment is not specially contemplated.

I do not claim, broadly, an electric lamp constructed with tilting sockets for carbons or other illuminating-electrodes arranged to tilt progressively toward each other, so as to maintain their illuminating-points in constant proximity during their consumption, as I limit my claim to the embodiment of this feature in a special form of lamp, as expressed in the fifth clause below.

What I claim as my invention is—

1. The described mode of regulating the electric current for electric lighting, consisting in the arrangement of a condenser of electricity in the circuit of the lights, provided with a means for increasing or decreasing the surface or capacity of the condenser in the circuit, substantially as herein set forth.

2. An electric-lighting apparatus consisting of a generator of electricity, one or more lamps, and a condenser of electricity, arranged in circuit with each other, with a means of increasing or decreasing the surface of the condenser in the circuit, substantially as herein shown and described.

3. In an electric-lighting apparatus, a condenser of electricity arranged in the circuit thereof, and formed in a series of sections, provided with a switch, whereby more or less of such sections may be thrown into the circuit, substantially as and for the purpose herein set forth.

4. The combination, in an electric-lighting apparatus, of an electric generator, one or more lamps, a sectional condenser of electricity, and one or more switches controlling the circuiting of the sections, with the lamp or lamps and the generator, substantially as herein shown and described.

5. An electric lamp consisting of a clock-movement fitted with radial arms rotated at slow speed by said movement and provided with sockets on their ends to receive the carbons, the points of which are fed toward each other at an inclination by the rotation of said arms, substantially as herein shown and described.

DAVID FLANERY.

Witnesses:
S. McG. FISHER,
J. R. PARKER.